(12) United States Patent
El-Azzami et al.

(10) Patent No.: US 12,574,411 B2
(45) Date of Patent: Mar. 10, 2026

(54) TRANSPORT LAYER SECURITY MANAGEMENT USING A MANAGEMENT CONTROLLER

(71) Applicant: Dell Products L.P., Round Rock, TX (US)

(72) Inventors: Bassem El-Azzami, Austin, TX (US); Richard M. Tonry, Georgetown, TX (US); Mohit Arora, Frisco, TX (US); Abeye Teshome, Austin, TX (US); Vinodkumar Vasudev Ottar, Mckinney, TX (US); Adolfo Sandor Montero, Pflugerville, TX (US); Luis Antonio Valencia Reyes, Waxaahchie, TX (US); Rajaravi Chandra Kollarapu, Allen, TX (US)

(73) Assignee: Dell Products L.P., Round Rock, TX (US)

( * ) Notice: Subject to any disclaimer, the term of this patent is extended or adjusted under 35 U.S.C. 154(b) by 135 days.

(21) Appl. No.: 18/425,249

(22) Filed: Jan. 29, 2024

(65) Prior Publication Data

US 2025/0247425 A1     Jul. 31, 2025

(51) Int. Cl.
*H04L 9/40* (2022.01)
*H04L 9/30* (2006.01)
*H04L 9/32* (2006.01)

(52) U.S. Cl.
CPC .......... *H04L 63/166* (2013.01); *H04L 9/3073* (2013.01); *H04L 9/3268* (2013.01); *H04L 63/0428* (2013.01)

(58) Field of Classification Search
CPC ... H04L 63/166; H04L 9/3073; H04L 9/3268; H04L 63/0428
See application file for complete search history.

(56) References Cited

U.S. PATENT DOCUMENTS

| | | | |
|---|---|---|---|
| 8,042,182 B2 | 10/2011 | Milani Comparetti et al. |
| 8,615,785 B2 | 12/2013 | Elrod et al. |
| 8,924,620 B2 | 12/2014 | Harriman et al. |
| 9,215,244 B2 | 12/2015 | Ayyagari et al. |
| 9,529,602 B1 | 12/2016 | Swierk |
| 9,734,169 B2 | 8/2017 | Redlich et al. |

(Continued)

FOREIGN PATENT DOCUMENTS

WO          2024102715 A1      5/2024

*Primary Examiner* — Yonas A Bayou
(74) *Attorney, Agent, or Firm* — WOMBLE BOND DICKINSON (US) LLP

(57) ABSTRACT

Methods and systems for managing an endpoint device are disclosed. To do so, a key pair may be generated by a management controller of the endpoint device and a private key of the key pair may be kept secret by the management controller. A public key of the public private key pair may be provided to a first entity for use in generating a certificate for the endpoint device. The certificate may be provided to a second entity desiring a level of trust with the endpoint device. As a portion of establishing a secure connection between the second entity and the endpoint device, a TLS handshake may be performed. Performing the TLS handshake may include obtaining a TLS packet, signing the TLS packet using the private key, and providing the signed TLS packet to the second entity to demonstrate that the endpoint device is trustworthy for the level of trust.

20 Claims, 8 Drawing Sheets

(56)                    References Cited

U.S. PATENT DOCUMENTS

| | | | |
|---|---|---|---|
| 10,176,308 B2 | 1/2019 | Mintz et al. | |
| 10,298,670 B2 | 5/2019 | Ben-Shaul et al. | |
| 10,671,765 B2 | 6/2020 | Swierk et al. | |
| 11,036,902 B2 | 6/2021 | Nicholas | |
| 11,102,122 B2 | 8/2021 | Seed et al. | |
| 11,134,380 B2 | 9/2021 | Fox et al. | |
| 11,487,274 B2 | 11/2022 | Valder et al. | |
| 11,792,267 B2 | 10/2023 | Kreiner et al. | |
| 2010/0242106 A1* | 9/2010 | Harris | H04L 63/08 |
| | | | 709/224 |
| 2010/0325419 A1* | 12/2010 | Kanekar | H04L 67/1001 |
| | | | 713/151 |
| 2011/0087387 A1 | 4/2011 | Safa-Bakhsh et al. | |
| 2012/0266259 A1 | 10/2012 | Lewis | |
| 2013/0019239 A1 | 1/2013 | Fontignie | |
| 2014/0282936 A1 | 9/2014 | Fitzgerald | |
| 2014/0304497 A1 | 10/2014 | Park | |
| 2015/0371032 A1* | 12/2015 | Puli | H04L 63/08 |
| | | | 726/7 |
| 2017/0357515 A1 | 12/2017 | Bower, III | |
| 2018/0039946 A1 | 2/2018 | Bolte et al. | |
| 2018/0082065 A1 | 3/2018 | Liu | |
| 2018/0137284 A1 | 5/2018 | Oh | |
| 2018/0351941 A1* | 12/2018 | Chhabra | H04L 63/08 |
| 2019/0034925 A1 | 1/2019 | Sundaresan | |
| 2020/0028699 A1* | 1/2020 | Sharifi Mehr | H04L 9/14 |
| 2020/0314115 A1* | 10/2020 | Nabeesa | H04L 63/1408 |
| 2021/0034048 A1 | 2/2021 | Hajizadeh | |
| 2021/0073211 A1 | 3/2021 | Wright, Sr. | |
| 2021/0397716 A1 | 12/2021 | Kovah | |
| 2022/0038659 A1 | 2/2022 | Michel | |
| 2023/0224294 A1 | 7/2023 | Halemane | |
| 2023/0246827 A1 | 8/2023 | Luciani, Jr. | |
| 2025/0181859 A1 | 6/2025 | Mouyade | |

* cited by examiner

TRANSPORT LAYER SECURITY MANAGEMENT USING A MANAGEMENT CONTROLLER

FIELD

Embodiments disclosed herein relate generally to managing endpoint devices. More particularly, embodiments disclosed herein relate to systems and manage transport layer security for an endpoint device using at least a management controller.

BACKGROUND

Computing devices may provide computer-implemented services. The computer-implemented services may be used by users of the computing devices and/or devices operably connected to the computing devices. The computer-implemented services may be performed with hardware components such as processors, memory modules, storage devices, and communication devices. The operation of these components and the components of other devices may impact the performance of the computer-implemented services.

BRIEF DESCRIPTION OF THE DRAWINGS

Embodiments disclosed herein are illustrated by way of example and not limitation in the figures of the accompanying drawings in which like references indicate similar elements.

DETAILED DESCRIPTION

Figure 1A:
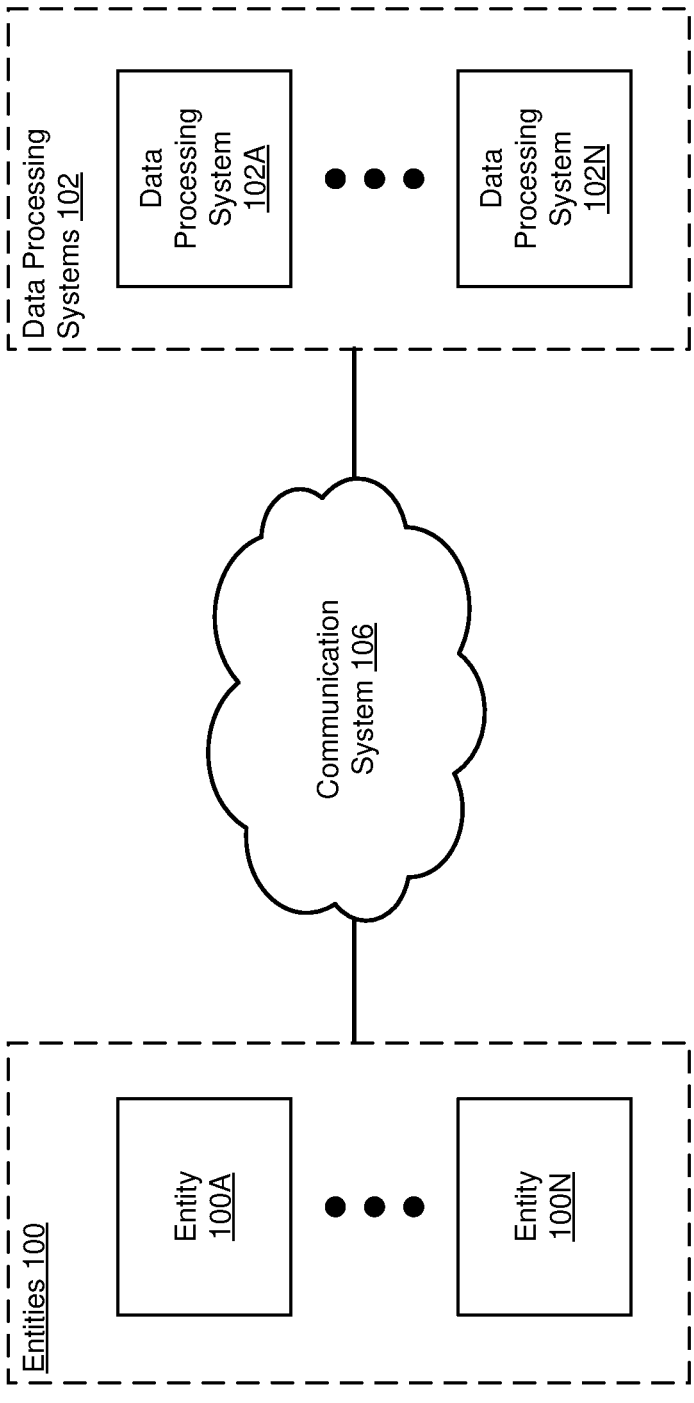
FIG. 1A shows a block diagram illustrating a system in accordance with an embodiment.

Various embodiments will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments disclosed herein.

Reference in the specification to "one embodiment" or "an embodiment" means that a particular feature, structure, or characteristic described in conjunction with the embodiment can be included in at least one embodiment. The appearances of the phrases "in one embodiment" and "an embodiment" in various places in the specification do not necessarily all refer to the same embodiment.

References to an "operable connection" or "operably connected" means that a particular device is able to communicate with one or more other devices. The devices themselves may be directly connected to one another or may be indirectly connected to one another through any number of intermediary devices, such as in a network topology.

In general, embodiments disclosed herein relate to methods and systems for managing endpoint devices (e.g., data processing systems). The endpoint devices may provide computer-implemented services to any type and number of other devices and/or users of the endpoint devices. The computer-implemented services may include any quantity and type of such services.

The endpoint devices may operate in a distributed environment in which the computer-implemented services are cooperatively provided by entities throughout the distributed environment. To cooperatively perform the computer-implemented services, the entities (e.g., the endpoint devices, servers, other devices) may exchange information (e.g., sensitive information) during any number of interactions.

However, the computer-implemented services may not be provided as desired (e.g., the sensitive information may be acquired by unauthorized entities) if the endpoint devices and/or the interactions between the entities are compromised. To reduce a likelihood of compromise of the interactions (e.g., by the unauthorized entities), trust may be established between the entities prior to the interactions.

Establishing trust (e.g., via establishing a secure connection) may allow sensitive information to be securely shared between the endpoint devices and other entities. Establishing the secure connection may include transport layer security (TLS) protocols (e.g., a TLS handshake).

The TLS handshake may include signing a data structure using a trusted private key by an endpoint device of the endpoint devices and providing the signed data structure (e.g., a signed TLS packet) to an entity desiring a level of trust with the endpoint device. The entity desiring the level of trust may be in possession of a certificate for the endpoint device.

To do so, each endpoint device of the endpoint devices may include a management controller and a software agent hosted by hardware resources of the endpoint device. The endpoint device may leverage generation of a public private key pair by the management controller to facilitate secure communications between the endpoint device and other entities. Specifically, the management controller may generate the public private key pair and may store the private key of the public private key pair in storage screened from hardware resources of the endpoint device.

By doing so, establishing a secure connection between the endpoint device and the entity desiring the level of trust may be performed without disclosing the private key to components of the endpoint device other than the management controller and/or to any other entities. Consequently, TLS packets and/or other data structures may be signed by the management controller and may be provided to other entities for security purposes (e.g., a portion of a process to establish a mutually trusted session key for future communications).

In an embodiment, a method of managing an endpoint device comprising hardware resources and a management controller that operates independently of the hardware resources is provided. The method may include: generating, by a management controller of the endpoint device, a public private key pair and storing a private key of the public private key pair in storage screened from the hardware resources; providing, by the management controller, a public key of the public private key pair to a first entity, the public key being usable to generate a certificate for the endpoint device; obtaining, by the management controller and responsive to the providing, the certificate from the first entity, the certificate having been generated using the public key; and signing, by the management controller and using a private key of the public private key pair, a data structure usable to establish a level of trust with a second entity that has access to the certificate.

Signing the data structure may include: obtaining, by the management controller and via an out of band communication channel, the data structure from the second entity, the data structure being a transport layer security (TLS) packet; signing, by the management controller and using the private key of the public private key pair, the TLS packet to obtain a signed TLS packet; and providing, by the management controller and via the out of band communication channel, the signed TLS packet to the second entity to demonstrate that the endpoint device is trustworthy for the level of trust.

The method may also include: obtaining, by a software agent hosted by hardware resources of the endpoint device and via an in band communication channel, a second data structure from a third entity, the third entity having access to the certificate for the endpoint device and the second data structure being a second TLS packet; providing, by the software agent and via a side band communication channel, a second TLS packet to the management controller; signing, by the management controller and using the private key of the public private key pair, the second TLS packet to obtain a second signed TLS packet; providing, by the management controller and via the side band communication channel, the second signed TLS packet to the software agent; and providing, by the software agent and via the in band communication channel, the second signed TLS packet to the third entity to demonstrate that the endpoint device is trustworthy for a second level of trust with the third entity.

The private key of the public private key pair may be kept secret by the management controller.

The method may also include: making an identification, by the management controller, that the public private key pair is to be replaced; and generating, by the management controller and in response to the identification, a second public private key pair to replace the public private key pair.

The public private key pair may be to be replaced when the private key of the public private key pair is suspected of being known by any other entity other than the management controller.

The public private key pair may be to be replaced when the public private key pair becomes stale.

The data processing system may include a network module adapted to separately advertise network endpoints for the management controller and the hardware resources, the network endpoints being usable by the server to address communications to the hardware resources using an in band communication channel and the management controller using the out of band communication channel.

The management controller and the network module may be on separate power domains from the hardware resources so that the management controller and the network module are operable while the hardware resources are inoperable.

The out of band communication channel may run through the network module, and an in band communication channel that services the hardware resources may also run through the network module.

The network module may host a transmission control protocol/internet protocol (TCP/IP) stack to facilitate network communications via the out of band communication channel.

In an embodiment, a non-transitory media is provided. The non-transitory media may include instructions that when executed by a processor cause the computer-implemented method to be performed.

In an embodiment, a data processing system is provided. The data processing system may include the non-transitory media and a processor, and may perform the method when the computer instructions are executed by the processor.

Turning to FIG. 1A, a block diagram illustrating a distributed environment in accordance with an embodiment is shown. The distributed environment (e.g., the system) shown in FIG. 1A may provide for management of endpoint devices that may provide, at least in part, computer-implemented services.

Figure 1B:
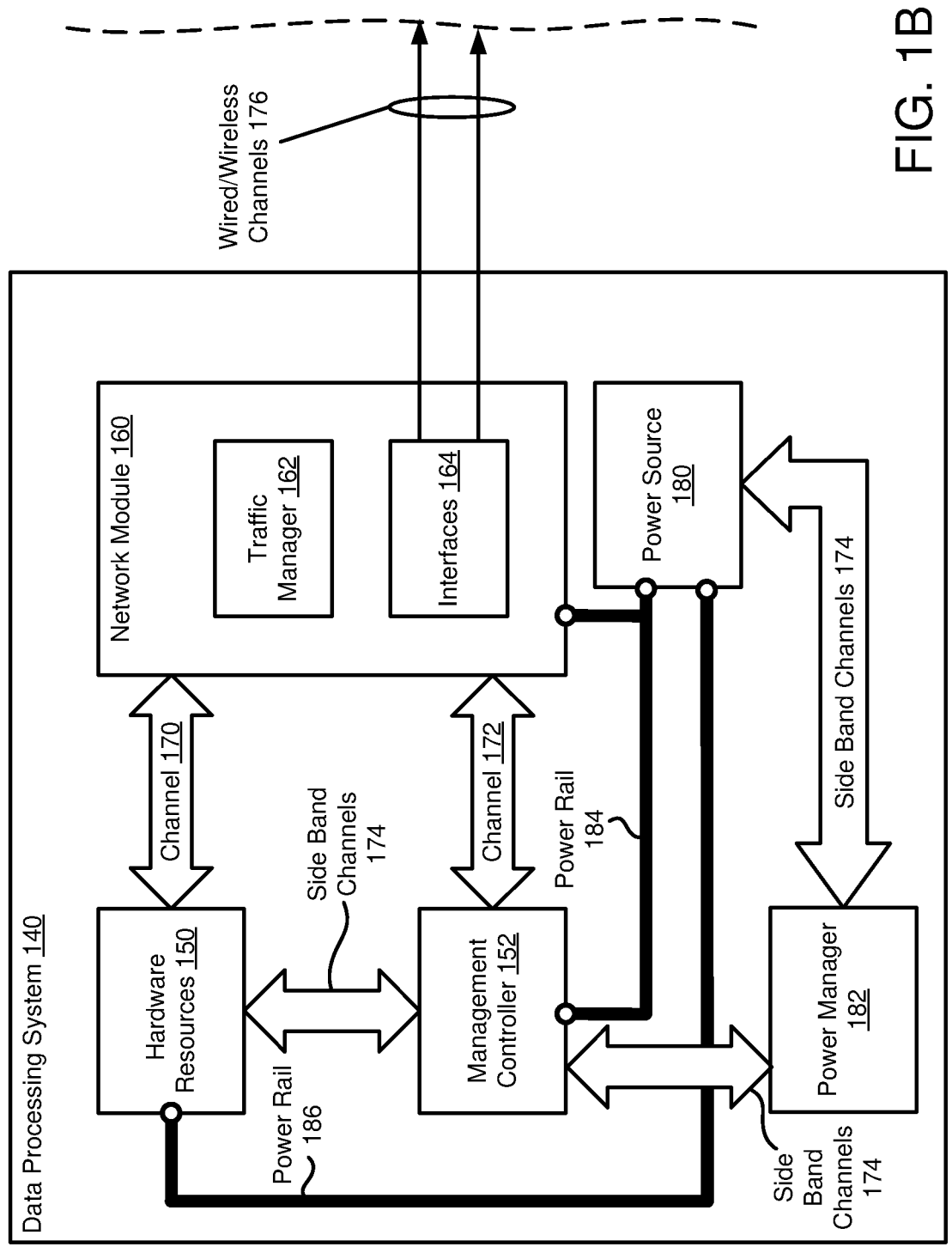
FIG. 1B shows a block diagram illustrating a data processing system in accordance with an embodiment.
Figure 1C:
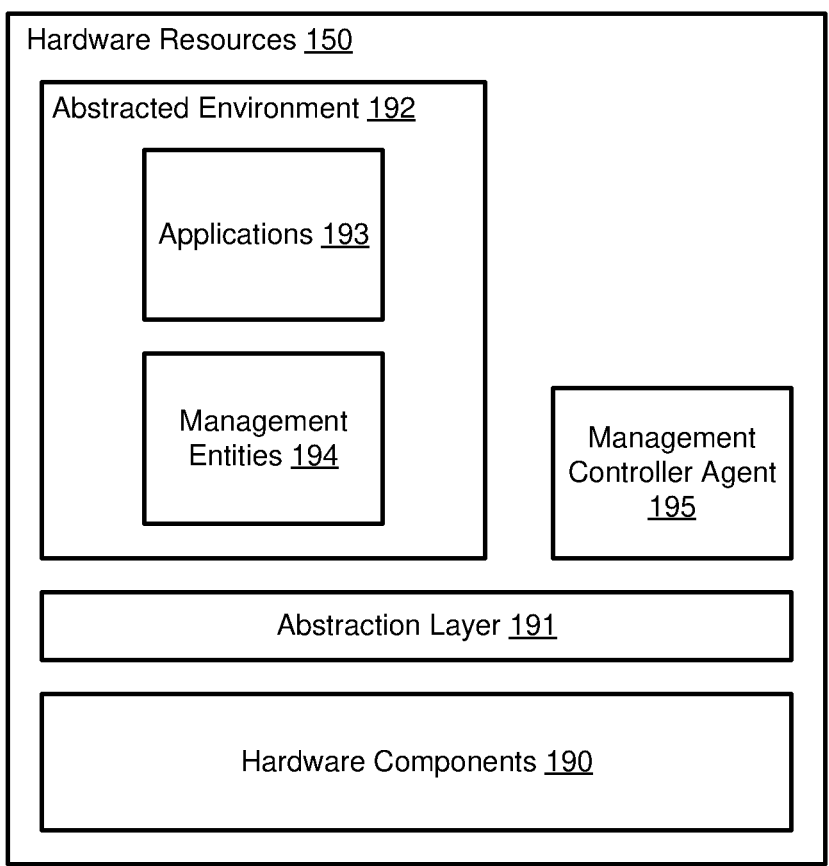
FIG. 1C shows a block diagram illustrating hardware resources of a data processing system in accordance with an embodiment.

The system may include any number of endpoint devices (e.g., data processing systems 102) that may each include any number of hardware components (e.g., processors, memory modules, storage devices, communications devices). The hardware components may support execution of any number and types of applications (e.g., software components). Data processing systems 102 may provide similar and/or different computer-implemented services and may provide the computer-implemented services independently and/or in cooperation with other devices. Changes in available functionalities of the hardware and/or software components may provide for various types of different computer-implemented services to be provided over time. Refer to FIGS. 1B-1C for additional details regarding data processing systems 102.

The computer-implemented services may include any type and quantity of computer-implemented services. The computer-implemented services may include, for example, database services, data processing services, electronic communication services, and/or any other services that may be provided using one or more computing devices. The computer-implemented services may be provided by, for example, entities 100, data processing systems 102 and/or any other type of devices (not shown in FIG. 1A). Other types of computer-implemented services may be provided by the system shown in FIG. 1A without departing from embodiments disclosed herein.

In the distributed environment, the computer-implemented services may be cooperatively provided by at least the components shown in FIG. 1A. To cooperatively provide the computer-implemented services, the components of FIG. 1A may interact to, for example, manage trust between the components of FIG. 1A. The computer-implemented services may not be provided as desired if data processing systems 102, other components of FIG. 1A, and/or interactions between the components are compromised by a malicious entity.

In general, embodiments disclosed herein relate to systems, devices, and methods for establishing trusted connections and, therefore, facilitating secure communications between entities in a distributed environment. To do so, a data processing system (e.g., 102A) may interact with one or more remote entities (e.g., entities 100) while providing the computer-implemented services.

Establishing a secure connection between data processing system 102A and a remote entity (e.g., entity 100A) may include obtaining a shared secret (e.g., a session key) for use in encrypting data transmitted between data processing system 102A and entity 100A.

Specifically, entity 100A may be a server, orchestrator, and/or other entity desiring a level of trust with data processing system 102A as part of, for example, a set up process for data processing system 102A. Entity 100A may have access to a certificate (e.g., an identity certificate) for data processing system 102A, the certificate being signed using a private key of a public private key pair generated and kept secret (e.g., screened from hardware resources of data processing system 102A) by a management controller of data processing system 102A.

The session key may be established, at least in part, via performance of a TLS handshake between data processing system 102A and entity 100A. To do so, entity 100A may provide a data structure (e.g., a TLS packet) to data processing system 102A and the management controller may sign the data structure using the private key of the public private key pair. The signed data structure may be provided to entity 100A to demonstrate that data processing system 102A is trustworthy.

As the private key is stored in storage of the management controller (e.g., storage screened from hardware resources of data processing system 102A), the data structure may be obtained (e.g., via a network module of data processing system 102A) via an in band communication channel and/or via an out of band communication channel. The in band communication channel may be used to direct communications to the hardware resources and the out of band communication channel may be used to direct communications to the management controller without traversing the hardware resources.

If the data structure traverses the out of band communication channel and, therefore, does not traverse any in band components of data processing system 102A, potential compromise of the in band components may not impact the data structure. If the data structure traverses the in band communication channel, the data structure may still be trusted by remote entities due to: (i) signing of the data structure by the management controller using the private key (e.g., which is never disclosed outside storage of the management controller), and (ii) assessment of a security posture of the hardware resources by the management controller prior to signing the data structure using the private key.

In addition, safety protocols may dictate that public private key pairs generated by the management controller are to be replaced under certain conditions (e.g., suspected compromise of the private key, the private key becomes stale). If any of these conditions are met, the management controller may generate a new public private key pair to replace the public private key pair.

To perform the above-mentioned functionality, the system of FIG. 1A may include data processing systems 102, and/or entities 100. Data processing systems 102, entities 100, and/or any other type of devices not shown in FIG. 1A may perform all, or a portion of the computer-implemented services independently and/or cooperatively. Each of these components is discussed below.

Data processing systems 102 may include any number and/or type of data processing systems (e.g., 102A-102N). Any of data processing systems 102 may be operated by users and/or may provide computer-implemented services based on the users' operation. Any of data processing systems 102 may include in band components (e.g., hardware resources) and out of band components (e.g., a management controller), and functionality that may allow the out of band components to (i) communicate with one another independently from the in band components, (ii) perform operations independently from the in band components, and/or (ii) communicate with remote systems independently from the in band components. For more information regarding components of data processing systems 102, refer to the discussion of FIG. 1B.

Entities 100 may include any number of entities (e.g., 100A-100N). Entities 100 may be implemented using any number of physical devices, may be operated by users and/or may provide computer-implemented services.

As a first example, an entity of entities 100 may be a remote device that desires a level of trust with one or more of data processing systems 102. Entities 100 may manage device registrations, identity certificates, public keys (e.g., the manufacturer public key, management controller public keys), entitlements, and/or other information related to data processing systems 102. Entities 100 may include, for example, identity servers, orchestrators, etc.

Any of the components illustrated in FIG. 1A may be operably connected to each other (and/or components not illustrated) with communication system 106.

Communication system 106 may include one or more networks that facilitate communication between any number of components. The networks may include wired networks and/or wireless networks (e.g., and/or the Internet). The networks may operate in accordance with any number and types of communication protocols (e.g., such as the internet protocol).

Communication system 106 may be implemented with one or more local communications links (e.g., a bus interconnecting a processor of any of data processing systems 102 and entities 100).

Communication system 106 may include out of band communication channels, in band communication channels, and/or other types of communication channels.

Refer to FIG. 1B for additional details regarding the management controller, network module, in band communication channel, out of band communication channel, and/or hardware resources of data processing systems 102.

Turning to FIG. 1B, a diagram illustrating data processing system 140 in accordance with an embodiment is shown. Data processing system 140 may be similar to any of data processing systems 102 shown in FIG. 1A.

To provide computer-implemented services, data processing system 140 may include any quantity of hardware resources 150. Hardware resources 150 may be in band hardware components, and may include a processor operably coupled to memory, storage, and/or other hardware components.

The processor may host various management entities such as operating systems, drivers, network stacks, and/or other software entities that provide various management functionalities. For example, the operating system and drivers may provide abstracted access to various hardware resources. Likewise, the network stack may facilitate packaging, transmission, routing, and/or other functions with respect to exchanging data with other devices.

For example, the network stack may support transmission control protocol/internet protocol communication (TCP/IP) (e.g., the Internet protocol suite) thereby allowing hardware resources 150 to communicate with other devices via packet switched networks and/or other types of communication networks.

The processor may also host various applications that provide the computer-implemented services. The applications may utilize various services provided by the management entities and use (at least indirectly) the network stack to communicate with other entities.

However, use of the network stack and the services provided by the management entities may place the applications at risk of indirect compromise. For example, if any of these entities trusted by the applications are compromised, these entities may subsequently compromise the operation of the applications. For example, if various drivers and/or the communication stack are compromised, communications to/from other devices may be compromised. If the applications trust these communications, then the applications may also be compromised.

For example, to communicate with other entities, an application may generate and send communications to a network stack and/or driver, which may subsequently transmit a packaged form of the communication via channel 170 to a communication component, which may then send the packaged communication (in a yet further packaged form, in some embodiments, with various layers of encapsulation being added depending on the network environment outside of data processing system 140) to another device via any number of intermediate networks (e.g., via wired/wireless channels 176 that are part of the networks).

In addition, different configurations of hardware resources 150 and/or software resources may be implemented by data processing system 140 based on the type of computer-implemented services that are to be provided. Modifications to configurations of hardware resources 150 and/or the software resources may lead to downtime for data processing system 140 and may consume network bandwidth of channel 170.

To reduce the downtime of data processing system 140 and to reduce the likelihood of the applications and/or other in band entities from being indirectly compromised, data processing system 140 may include management controller 152 and network module 160. Each of these components of data processing system 140 is discussed below.

Management controller 152 may be implemented, for example, using a system on a chip or other type of independently operating computing device (e.g., independent from the in band components, such as hardware resources 150, of a host data processing system 140). Management controller 152 may provide various management functionalities for data processing system 140. For example, management controller 152 may monitor various ongoing processes performed by the in band components, may manage power distribution, thermal management, and/or other functions of data processing system 140.

To do so, management controller 152 may be operably connected to various components via side band channels 174 (in FIG. 1B, a limited number of side band channels are included for illustrative purposes, it will be appreciated that management controller 152 may communicate with other components via any number of side band channels). The side band channels may be implemented using separate physical channels, and/or with a logical channel overlay over existing physical channels (e.g., logical division of in band channels). The side band channels may allow management controller 152 to interface with other components and implement various management functionalities such as, for example, general data retrieval (e.g., to snoop ongoing processes), telemetry data retrieval (e.g., to identify a health condition/other state of another component), function activation (e.g., sending instructions that cause the receiving component to perform various actions such as displaying data, adding data to memory, causing various processes to be performed), and/or other types of management functionalities.

For example, to reduce the likelihood of indirect compromise of an application hosted by hardware resources 150, management controller 152 may enable information from other devices to be provided to the application without traversing the network stack and/or management entities of hardware resources 150. To do so, the other devices may direct communications including the information to management controller 152. Management controller 152 may then, for example, send the information via side band channels 174 to hardware resources 150 (e.g., to store it in a memory location accessible by the application, such as a shared memory location, a mailbox architecture, or other type of memory-based communication system) to provide it to the application. Thus, the application may receive and act on the information without the information passing through potentially compromised entities. Consequently, the information may be less likely to also be compromised, thereby reducing the possibility of the application becoming indirectly compromised. Similar processes may be used to facilitate outbound communications from the applications.

Management controller 152 may be operably connected to communication components of data processing system 140 via separate channels (e.g., 172) from the in band components, and may implement or otherwise utilize a distinct and independent network stack (e.g., TCP/IP). Consequently, management controller 152 may communicate with other devices independently of any of the in band components (e.g., does not rely on any hosted software, hardware components, etc.). Accordingly, compromise of any of hardware resources 150 and hosted component may not result in indirect compromise of any management controller 152, and entities hosted by management controller 152.

Figure 2A:
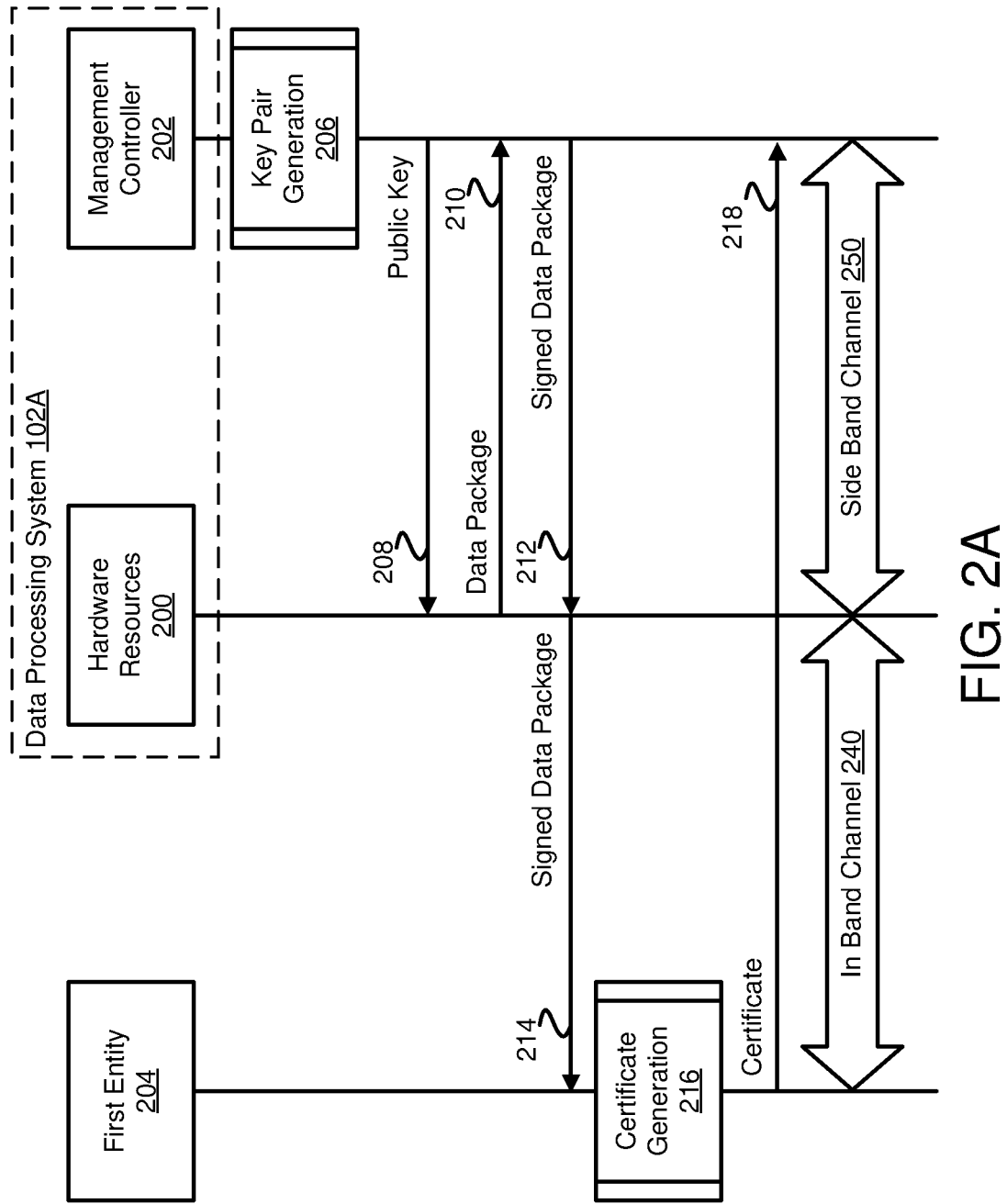
FIGS. 2A-2C show interaction diagrams in accordance with an embodiment.
Figure 2B:
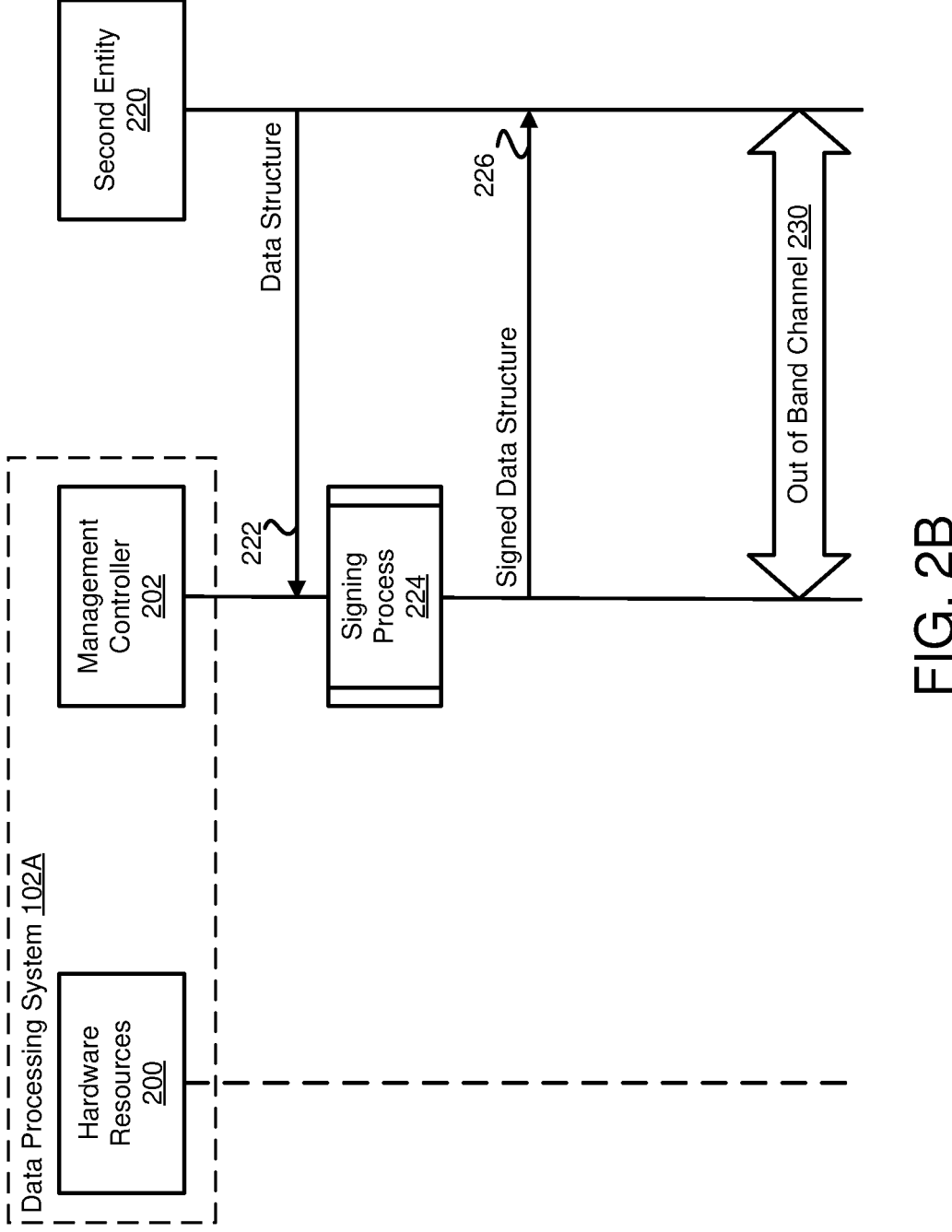
Figure 2C:
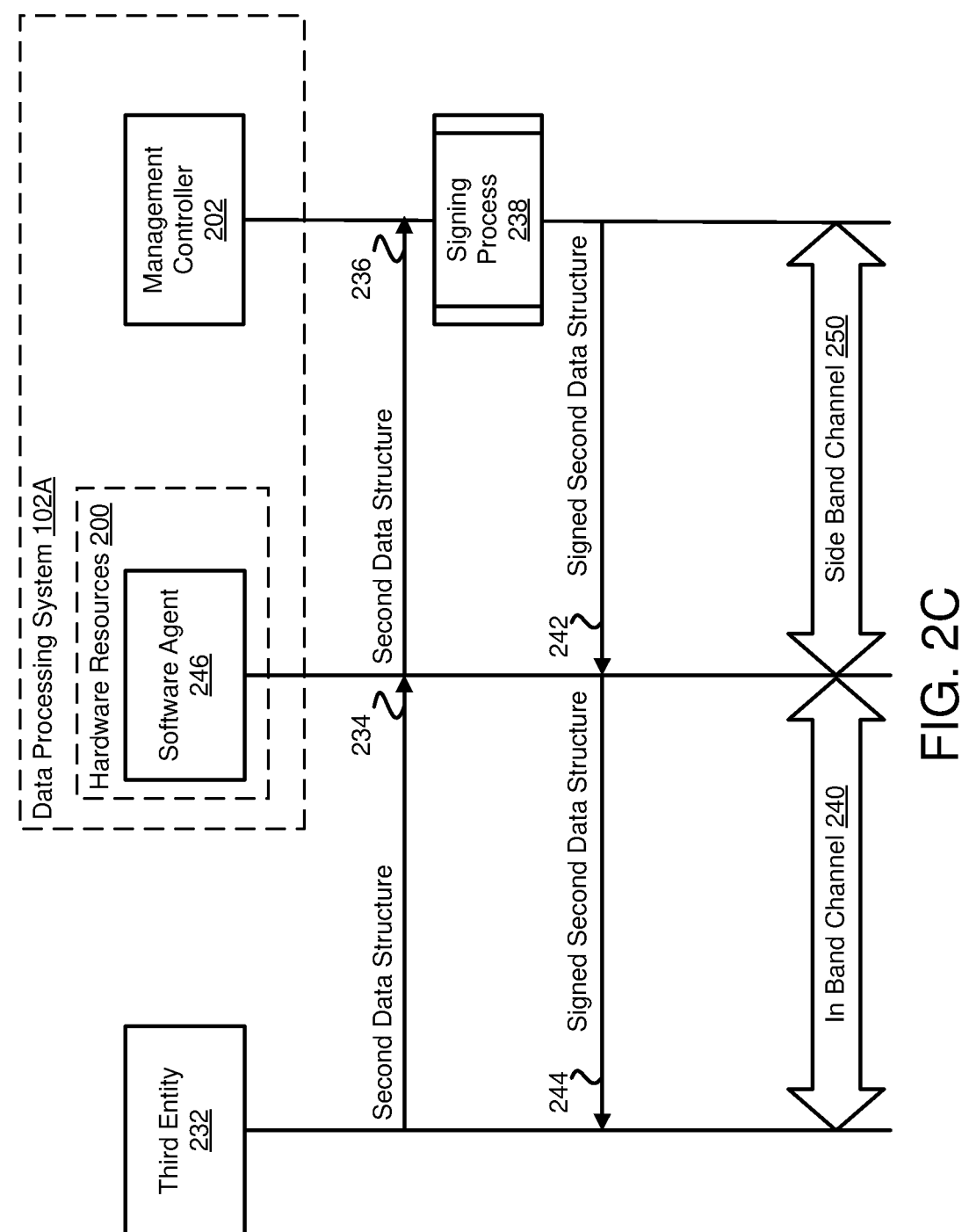

To provide its functionality, management controller 152 may: (i) generate a public private key pair and may store the public private key pair in storage screened from hardware resources 150, (ii) provide a public key of the public private key pair to a first entity, the public key being usable to generate a certificate for the endpoint device, (iii) obtain, responsive to the providing, the certificate from the first entity, the certificate having been generated using the public key, and/or (iv) sign, using a private key of the public private key pair, a data structure usable to establish a level of trust with a second entity that has access to the certificate. Refer to FIGS. 2A-2C for additional details regarding obtaining the certificate and signing the data structure.

To facilitate communication with other devices, data processing system 140 may include network module 160. Network module 160 may provide communication services for in band components and out of band components (e.g., management controller 152) of data processing system. Specifically, an out of band communication channel (e.g., 172) that services management controller 152 and an in band communication channel (e.g., 170) that services hardware resources 150 may run through network module 160. Network module 160 may host a TCP/IP stack to facilitate network communications via the out of band communication channel. To do so, network module 160 may include traffic manager 162 and interfaces 164.

Traffic manager 162 may include functionality to (i) discriminate traffic directed to various network endpoints advertised by data processing system 140, and (ii) forward the traffic to/from the entities associated with the different network endpoints. For example, to facilitate communications with other devices, network module 160 may advertise different network endpoints (e.g., different media access control address/internet protocol addresses) for the in band components and out of band components. Thus, other entities may address communications to these different network endpoints. When such communications are received by network module 160, traffic manager 162 may discriminate and direct the communications accordingly (e.g., over channel 170 or channel 172, in the example shown in FIG. 1B, it will be appreciated that network module 160 may discriminate traffic directed to any number of data units and direct it accordingly over any number of channels).

Accordingly, traffic directed to management controller 152 may never flow through any of the in band components. Likewise, outbound traffic from the out of band component may never flow through the in band components.

To support inbound and outbound traffic, network module 160 may include any number of interfaces 164. Interfaces 164 may be implemented using any number and type of communication devices which may each provide wired and/or wireless communication functionality. For example, interfaces 164 may include a wide area network card, a WiFi card, a wireless local area network card, a wired local area network card, an optical communication card, a radio access network (RAN) card, a wide area network (WAN) card, and/or other types of communication components. These components may support any number of wired/wireless channels 176.

Thus, from the perspective of an external device, the in band components and out of band components of data processing system 140 may appear to be two independent network entities, that may independently addressable, and otherwise unrelated to one another.

To facilitate management of data processing system 140 over time, hardware resources 150, management controller 152 and/or network module 160 may be positioned in separately controllable power domains. By being positioned in these separate power domains, different subsets of these components may remain powered while other subsets are unpowered.

For example, management controller 152 and network module 160 may remain powered while hardware resources 150 is unpowered. Consequently, management controller 152 may remain able to communication with other devices even while hardware resources 150 are inactive. Similarly, management controller 152 may perform various actions while hardware resources 150 are not powered and/or are otherwise inoperable, unable to cooperatively perform various process, are compromised, and/or are unavailable for other reasons.

To implement the separate power domains, data processing system 140 may include a power source (e.g., 180) that separately supplies power to power rails (e.g., 184, 186) that power the respective power domains. Power from the power source (e.g., a power supply, battery, etc.) may be selectively provided to the separate power rails to selectively power the different power domains. A power manager (e.g., 182) may manage power from power source 180 is supplied to the power rails (e.g., by providing instructions via side band channels 174). Management controller 152 may cooperate with power manager 182 to manage supply of power to these power domains. Management controller 152 may communicate with power manager 182 via side band channels 174 and/or via other means.

In FIG. 1B, an example implementation of separate power domains using power rails 184-186 is shown. The power rails may be implemented using, for example, bus bars or other types of transmission elements capable of distributing electrical power. While not shown, it will be appreciated that the power domains may include various power management components (e.g., fuses, switches, etc.) to facilitate selective distribution of power within the power domains.

Figure 3:
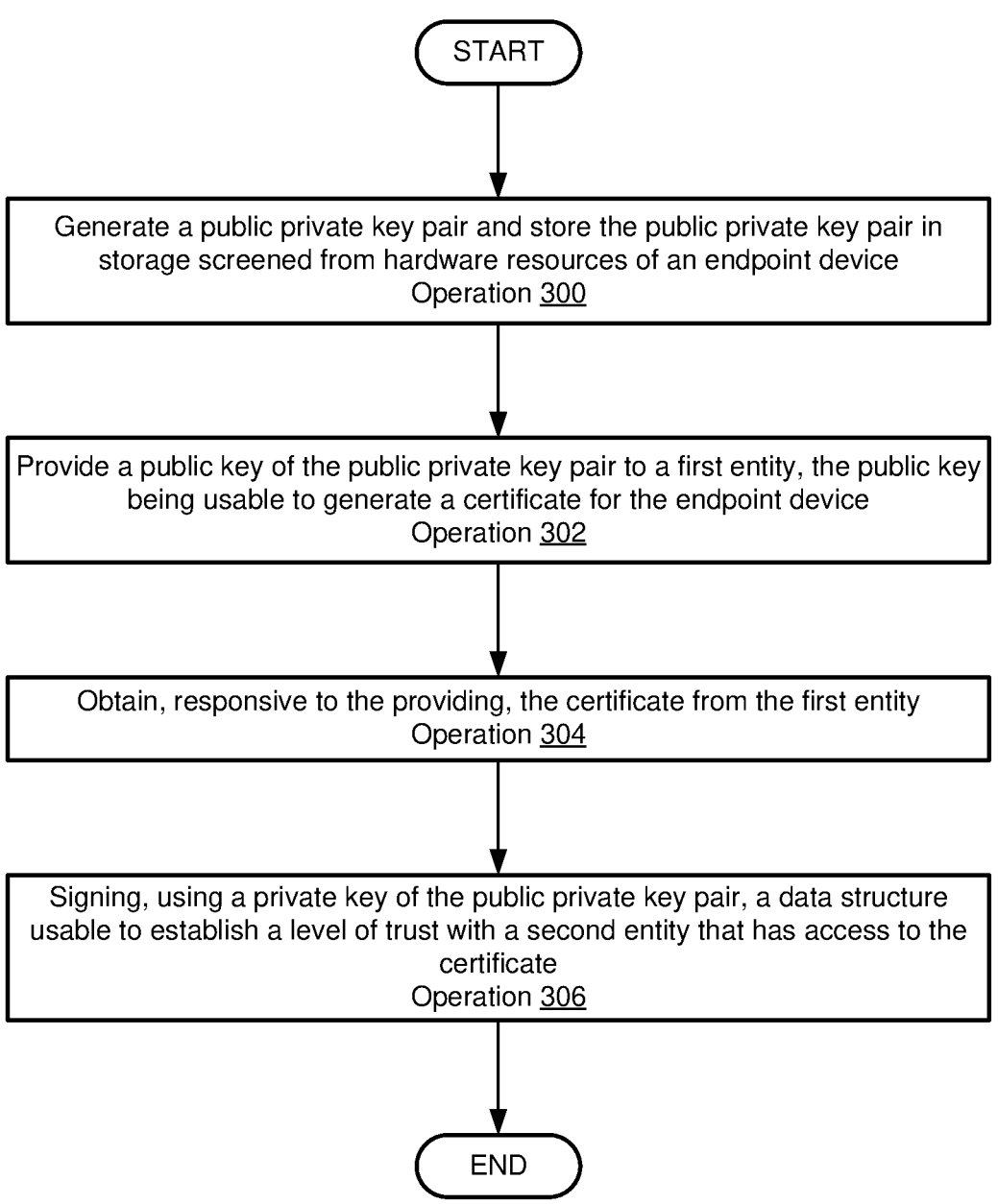
FIG. 3 shows a flow diagram illustrating a method of managing transport layer security for an endpoint device in accordance with an embodiment.

When providing its functionality, components of data processing system 140 may perform all, or a portion, of the methods and operations illustrated in FIGS. 2A-3.

While illustrated in FIG. 1B with a limited number of specific components, a system may include additional, fewer, and/or different components without departing from embodiments disclosed herein.

Turning to FIG. 1C, to provide computer-implemented services, hardware resources 150 may host applications 193 and management entities 194. Management entities 194 may include, for example, drivers, operating systems, and/or other entities that facilitate operation of applications 193 by facilitating use of hardware resources 150. Hardware resources 150 may include processors, memory modules, storage devices, and/or other types of hardware components usable to provide computer-implemented services.

Applications 193 may provide any quantity and type of computer-implemented services using hardware components 190. When operating, applications 193 may use abstracted access to the functionality of hardware components 190 provided by management entities 194. For example, the applications may make calls to an operating system which in turn makes calls to drivers which in turn communicate with the hardware components to invoke their various functionalities.

In an embodiment, hardware resources 150 also hosts abstraction layer 191. Abstraction layer 191 may include software such as hypervisors, dockers, and/or other entities that provide abstracted access to hardware components to various abstracted environments (e.g., 192). The abstracted environments may include virtual machines, containers, etc. Through abstraction layer 191 and abstracted environments, hardware resources 150 may host various instances of management entities and applications that may utilize the functionalities of hardware components 190.

To facilitate cooperation between management controller 152 and hardware resources 150, hardware resources 150 may host management controller agent 195. Management controller agent 195 may be independent from the abstracted environments, and may facilitate communication with and performance of instructions by management controller 152.

For example, management controller agent 195 may include functionality to (i) monitor various abstracted environments, and components therein, (ii) identify operating states (e.g., nominal, stalled, in error of various levels of severity), (iii) obtain information regarding the states of the environments such as, for example, content of virtualized memory, processors, logs of operation of various software and/or abstracted hardware components, (iv) write data to and/or otherwise communicate with the entities in the virtualized environments, (v) make modifications to the virtualized environment and/or entities hosted thereby through invocation of various functions of abstraction layer 191 and/or other entities, (vi) adjust distribution of use of hardware components 190 by the abstracted environment, and/or (vii) perform other types of management actions through which information regarding the operation of entities hosted by abstracted environment 192 may be collected.

As discussed above, the components of FIGS. 1A-1C may perform various methods to manage trust between the data processing system and other entities. FIGS. 2A-3 may illustrate examples of methods that may be performed by the components of FIGS. 1A-1C. For example, a management controller similar to management controller 152 and/or hardware resources similar to hardware resources 150 may perform all or a portion of the methods. In the diagrams discussed below and shown in FIGS. 2A-3, any of the operations may be repeated, performed in different orders, and/or performed in parallel with or in a partially overlapping in time manner with other operations.

To further clarify embodiments disclosed herein, interaction diagrams in accordance with an embodiment are shown in FIGS. 2A-2C. These interaction diagrams may illustrate how data may be obtained and used within the system of FIGS. 1A-1C.

In the interaction diagrams, processes performed by and interactions between components of a system in accordance with an embodiment are shown. In the diagrams, components of the system are illustrated using a first set of shapes (e.g., hardware resources 200, management controller 202, etc.), located towards the top of each figure. Lines descend from these shapes. Processes performed by the components of the system are illustrated using a second set of shapes (e.g., key pair generation 206, etc.) superimposed over these lines. Interactions (e.g., communication, data transmissions, etc.) between the components of the system are illustrated using a third set of shapes (e.g., 208, 210, etc.) that extend between the lines. The third set of shapes may include lines terminating in one or two arrows. Lines terminating in a single arrow may indicate that one way interactions (e.g., data transmission from a first component to a second component) occur, while lines terminating in two arrows may indicate that multi-way interactions (e.g., data transmission between two components) occur.

Generally, the processes and interactions are temporally ordered in an example order, with time increasing from the top to the bottom of each page. For example, the interaction labeled as 208 may occur prior to the interaction labeled as 210. However, it will be appreciated that the processes and interactions may be performed in different orders, any may be omitted, and other processes or interactions may be performed without departing from embodiments disclosed herein.

Turning to FIG. 2A, a first interaction diagram in accordance with an embodiment is shown. The first interaction diagram may illustrate processes and interactions that may occur during generation of a certificate for data processing system 102A. Data processing system 102A may include hardware resources 200 and management controller 202. Hardware resources 200 may be similar to hardware resources 150 described in FIG. 1B and management controller 202 may be similar to management controller 152 described in FIG. 1B. First entity 204 may be similar to any of entities 100 described in FIG. 1A. For example, first entity 204 may be an identity server responsible for managing device registrations, certificates, etc. for data processing system 102A.

Prior to generating a certificate for data processing system 102A, management controller 202 may be registered with first entity 204 (not shown). By registering management controller 202 with first entity 204, first entity 204 may trust management controller 202 and may associate management controller 202 with data processing system 102A.

Management controller 202 may perform key pair generation 206 process to generate a public private key pair. Management controller 202 may perform key pair generation 206 process in response to a request from another entity (e.g., first entity 204) to initiate a process of generating a certificate for data processing system 102A, upon an occurrence of an event (e.g., a setup process for data processing system 102A by a new user of data processing system 102A) and/or for other reasons. Key pair generation 206 process may include generation of a public private key pair via execution of any key pair generation algorithm.

A private key of the public private key pair may be kept secret by management controller 202 and may not be distributed to any other entities throughout the distributed environment. The private key may be stored in storage of management controller 202 that is not accessible by other components of data processing system 102A and, therefore, may be screened from hardware resources 200. Screening the private key from hardware resources 200 may include denying access to the private key to hardware resources 200.

Following key pair generation 206 process and at interaction 208, management controller 202 may provide a public key to hardware resources 200 via side band channel 250. Side band channel 250 may be similar to any of side band channels 174 described in FIG. 1B. Specifically, management controller 202 may exchange data with a software agent hosted by hardware resources 200 and responsible for managing interactions between hardware resources 200 and management controller 202. The software agent may be similar to, for example, management controller agent 195 described in FIG. 1C. The public key may be a public key of the public private key pair generated by management controller 202 during key pair generation 206 process.

For example, the public key may be generated and provided to hardware resources 200 via (i) transmission via a message, (ii) storing in a storage with subsequent retrieval by hardware resources 200, (iii) via a publish-subscribe system where hardware resources 200 subscribes to updates from management controller 202 thereby causing a copy of the public key to be propagated to hardware resources 200, and/or via other processes.

Hardware resources 200 may generate a data package using at least the public key in response to receiving the public key. Generation of the data package may be managed by the software agent. Generating the data package may include compiling the public key and/or other information (e.g., a list of identifiers, signatures (e.g., hashes of firmware code or other readable data)) into a data structure.

At interaction 210, hardware resources 200 may provide the data package to management controller 202. The data package may be provided side band channel 250 and may include instructions for management controller 202 to sign the data package using a private key of the public private key pair generated by management controller 202 during key pair generation 206 process.

For example, the data package may be generated and provided to management controller 202 via (i) transmission via a message, (ii) storing in a storage with subsequent retrieval by management controller 202, (iii) via a publish-subscribe system where management controller 202 subscribes to updates from hardware resources 200 thereby causing a copy of the data package to be propagated to management controller 202, and/or via other processes.

Management controller 202 may sign the data package using the private key. Prior to signing the data package using the private key, management controller 202 may determine whether a security posture of hardware resources 200 is sufficient (e.g., based on a threshold for the security posture indicated by a security policy). If the security posture is considered sufficient, management controller 202 may sign the data package using the private key to obtain a signed data package.

At interaction 212, management controller 202 may provide the signed data package to hardware resources 200 (e.g., managed by the software agent) via side band channel 250.

For example, the signed data package may be generated and provided to hardware resources 200 via (i) transmission via a message, (ii) storing in a storage with subsequent retrieval by hardware resources 200, (iii) via a publish-subscribe system where hardware resources 200 subscribes to updates from management controller 202 thereby causing a copy of the signed data package to be propagated to hardware resources 200, and/or via other processes.

At interaction 214, hardware resources 200 may direct the signed data package, via an interaction with a network module of data processing system 102A, to first entity 204 via in band channel 240. In band channel may be similar to channel 170 described in FIG. 1B.

For example, the signed data package may be provided to first entity 204 via (i) transmission via a message, (ii) storing in a storage with subsequent retrieval by first entity 204, (iii) via a publish-subscribe system where first entity 204 subscribes to updates from hardware resources 200 thereby causing a copy of the signed data package to be propagated to first entity 204, and/or via other processes.

First entity 204 may determine whether to generate a certificate based on the signed data package. To do so, first entity 204 may utilize the public key of the public private key pair to verify that the signed data package was signed using the private key of the public private key pair as part of certificate signing 216 process. If the private key is validated, certificate signing 216 process may include generation of a certificate for data processing system 102A. The certificate may include a cryptographically verifiable data structure indicating at least one delegation of authority over data processing system 102A. The certificate may be usable by other entities to establish trust with data processing system 102A.

At interaction 218, first entity 204 may provide a copy of the certificate to management controller 202. The copy of the certificate may be provided as a transmission over an out of band communication channel and, therefore, may bypass hardware resources 200. First entity 204 and management controller 202 may both maintain copies of the certificate in storage.

For example, the certificate may be provided to management controller 202 via (i) transmission via a message, (ii) storing in a storage with subsequent retrieval by management controller 202, (iii) via a publish-subscribe system where management controller 202 subscribes to updates from first entity 204 thereby causing a copy of the certificate to be propagated to management controller 202, and/or via other processes.

Doing so may complete a certificate signing request (CSR) request process for data processing system 102A. An entity desiring to establish a level of trust with data processing system 102A may request a copy of the certificate from first entity 204.

Consider a scenario in which another entity (e.g., second entity 220 shown in FIG. 2B) desires a level of trust with data processing system 102A and requests a copy of the certificate from first entity 204. Following obtaining the certificate, data processing system 102A and second entity 220 may perform a series of interactions to establish a secure connection and, therefore, the level of trust. The series of the interactions may include a TLS handshake.

Turning to FIG. 2B, a second interaction diagram in accordance with an embodiment is shown. The second diagram may illustrate processes and interactions that may occur during a TLS handshake process between data processing system 102A and second entity 220. Second entity 220 may be similar to any of entities 100 described in FIG. 1A. For example, second entity 220 may be an orchestrator responsible for managing entitlements for data processing system 102A.

The lines descending from some of the first set of shapes (e.g., 200) is drawn in dashing to indicate, for example, that the corresponding components may not be (i) operable, (ii)

powered on, (iii) present in the system, and/or (iv) not participating in operation of the system for other reasons.

At interaction 222 and as part of the TLS handshake process, second entity 220 may provide a data structure to management controller 202. The data structure may be provided to management controller 202 via out of band channel 230. Out of band channel 230 may be similar to channel 172 described in FIG. 1B.

For example, the data structure may be provided to management controller 202 via (i) transmission via a message, (ii) storing in a storage with subsequent retrieval by management controller 202, (iii) via a publish-subscribe system where management controller 202 subscribes to updates from second entity 220 thereby causing a copy of the data structure to be propagated to management controller 202, and/or via other processes.

The data structure may include, for example, a TLS packet. The TLS packet may include: (i) a timestamp associated with generation of the TLS packet, (ii) an identifier for second entity 220, (iii) an identifier for management controller 202, and/or (iv) other information usable to verify elements of the connection between data processing system 102A and second entity 220.

Following receipt of the data structure, management controller 202 may perform signing process 224 to obtain a signed data structure. Signing process 224 may include cryptographically signing, using a private key kept secret by management controller 202 (e.g., the private key generated during key pair generation 206 process described in FIG. 2A), the data structure.

At interaction 226, management controller 202 may provide the signed data structure to second entity 220. Management controller 202 may provide the signed data structure to second entity 220 via out of band channel 230 thereby bypassing hardware resources 200.

For example, the signed data structure may be provided to second entity 220 via (i) transmission via a message, (ii) storing in a storage with subsequent retrieval by second entity 220, (iii) via a publish-subscribe system where second entity 220 subscribes to updates from management controller 202 thereby causing a copy of the signed data structure to be propagated to second entity 220, and/or via other processes.

Doing so may complete at least a portion of a TLS handshake usable to establish a trusted connection between data processing system 102A and second entity 220.

Consider a scenario in which another entity (e.g., third entity 232 shown in FIG. 2C) desires a level of trust with data processing system 102A and requests a copy of the certificate from first entity 204. Following obtaining the certificate, data processing system 102A and third entity 232 may perform a series of interactions to establish a secure connection and, therefore, the level of trust. The series of the interactions may include a TLS handshake.

Turning to FIG. 2C, a third interaction diagram in accordance with an embodiment is shown. The third diagram may illustrate processes and interactions that may occur during a TLS handshake process between data processing system 102A and third entity 232.

At interaction 234 and as part of the TLS handshake process, third entity 232 may provide a second data structure to software agent 246. Software agent 246 may be similar to management controller agent 195 described in FIG. 1C. Software agent 246 may be hosted by hardware resources 200 and may manage communications between management controller 202 and hardware resources 200. The second data structure may be provided to software agent 246 via in band channel 240. In band channel 240 may be similar to channel 170 described in FIG. 1B.

For example, the second data structure may be provided to software agent 246 via (i) transmission via a message, (ii) storing in a storage with subsequent retrieval by software agent 246, (iii) via a publish-subscribe system where software agent 246 subscribes to updates from third entity 232 thereby causing a copy of the second data structure to be propagated to software agent 246, and/or via other processes.

The second data structure may include, for example, a second TLS packet. The second TLS packet may include: (i) a timestamp associated with generation of the second TLS packet, (ii) an identifier for third entity 232, (iii) an identifier for software agent 246, and/or (iv) other information usable to verify elements of the connection between data processing system 102A and third entity 232.

As part of managing interactions between hardware resources 200 and management controller 202, software agent 246 may provide the second data structure to management controller 202 via side band channel 250 at interaction 236. Side band channel 250 may be similar to any of side band channels 174 described in FIG. 1B.

For example, the second data structure may be provided to management controller 202 via (i) transmission via a message, (ii) storing in a storage with subsequent retrieval by management controller 202, (iii) via a publish-subscribe system where management controller 202 subscribes to updates from software entity 246 thereby causing a copy of the second data structure to be propagated to management controller 202, and/or via other processes.

Following receipt of the second data structure, management controller 202 may perform signing process 238 to obtain a signed second data structure. Prior to signing the second data structure, management controller 202 may verify a security posture of hardware resources 200. If the security posture is determined to be sufficient (e.g., via comparison to a threshold), management controller may proceed to perform signing process 238. Signing process 238 may include cryptographically signing, using a private key kept secret by management controller 202 (e.g., the private key generated during key pair generation 206 process described in FIG. 2A), the second data structure.

At interaction 242, management controller 202 may provide the signed second data structure to software agent 246 via side band channel 250.

For example, the signed second data structure may be provided to software agent 246 via (i) transmission via a message, (ii) storing in a storage with subsequent retrieval by software agent 246, (iii) via a publish-subscribe system where software agent 246 subscribes to updates from management controller 202 thereby causing a copy of the signed second data structure to be propagated to software agent 246, and/or via other processes.

At interaction 244, software agent 246 may provide the signed second data structure to third entity 232 via in band channel 240.

For example, the signed second data structure may be provided to third entity 232 via (i) transmission via a message, (ii) storing in a storage with subsequent retrieval by third entity 232, (iii) via a publish-subscribe system where third entity 232 subscribes to updates from software agent 246 thereby causing a copy of the signed second data structure to be propagated to third entity 232, and/or via other processes.

Doing so may complete at least a portion of the second TLS handshake usable to establish the trusted connection between data processing system 102A and third entity 232. By providing the second data structure to management controller 202 to perform signing process 238, a level of security associated with the second TLS handshake via in band components may be increased.

Any of the processes illustrated using the second set of shapes and interactions illustrated using the third set of shapes may be performed, in part or whole, by digital processors (e.g., central processors, processor cores, etc.) that execute corresponding instructions (e.g., computer code/software). Execution of the instructions may cause the digital processors to initiate performance of the processes. Any portions of the processes may be performed by the digital processors and/or other devices. For example, executing the instructions may cause the digital processors to perform actions that directly contribute to performance of the processes, and/or indirectly contribute to performance of the processes by causing (e.g., initiating) other hardware components to perform actions that directly contribute to the performance of the processes.

Any of the processes illustrated using the second set of shapes and interactions illustrated using the third set of shapes may be performed, in part or whole, by special purpose hardware components such as digital signal processors, application specific integrated circuits, programmable gate arrays, graphics processing units, data processing units, and/or other types of hardware components. These special purpose hardware components may include circuitry and/or semiconductor devices adapted to perform the processes. For example, any of the special purpose hardware components may be implemented using complementary metal-oxide semiconductor based devices (e.g., computer chips).

Any of the processes and interactions may be implemented using any type and number of data structures. The data structures may be implemented using, for example, tables, lists, linked lists, unstructured data, data bases, and/or other types of data structures. Additionally, while described as including particular information, it will be appreciated that any of the data structures may include additional, less, and/or different information from that described above. The informational content of any of the data structures may be divided across any number of data structures, may be integrated with other types of information, and/or may be stored in any location.

As discussed above, the components of FIGS. 1A-1C may perform various methods to manage endpoint devices. FIG. 3 illustrates methods that may be performed by the components of FIGS. 1A-1C. In the diagrams discussed below and shown in FIG. 3, any of the operations may be repeated, performed in different orders, and/or performed in parallel with or in a partially overlapping in time manner with other operations.

Turning to FIG. 3, a flow diagram illustrating a method of managing transport layer security for an endpoint device in accordance with an embodiment is shown. The method may be performed, for example, by a data processing system, any components of a data processing system (e.g., a management controller, hardware resources, a software agent), and/or any other entity.

At operation 300, a public private key pair may be generated, and the public private key pair may be stored in storage screened from hardware resources of the endpoint device. Generating the public private key pair may include execution of any key pair generation algorithm. Storing the public private key pair may include identifying a storage architecture that is screened from the hardware resources (e.g., non-volatile memory hosted, for example, by a management controller of the endpoint device) and saving a copy of the public private key pair in the storage architecture.

At operation 302, a public key of the public private key pair may be provided to a first entity, the public key being usable to generate a certificate for the endpoint device. Providing the public key to the first entity may include: (i) encapsulating at least the public key in a data structure, (ii) providing the encapsulated data structure to a network module of the endpoint device, the encapsulated data structure including a destination for transmission of the encapsulated data structure to the first entity via an out of band communication channel, and/or (iii) other methods.

Providing the public key to the first entity may also include performing at least a portion of a CSR process. Performing the CSR process may include at least: (i) generation of a data package including at least the public key, (ii) signing the data package using the private key of the public private key pair, (iii) providing the signed data package to the first entity for use in generation of the certificate, and/or (iv) other methods. Refer to FIG. 2A for additional details regarding the CSR process.

At operation 304, the certificate may be obtained responsive to the providing from the first entity. Obtaining the certificate may include receiving, via a communication channel (e.g., the out of band communication channel, the in band communication channel), the certificate as a message from the first entity. Obtaining the certificate may also include: (i) reading the certificate from storage, (ii) receiving the certificate from another entity responsible for managing certificates, and/or (iii) other methods.

At operation 306, a data structure may be signed, using the private key of the public private key pair, the data structure being usable to establish a level of trust with a second entity that has access to the certificate. Signing the data structure may include performing at least a portion of a TLS handshake process to establish the level of trust (e.g., a secure communication channel via establishing a shared session key) with the second entity.

Signing the data structure may include: (i) obtaining, via an out of band communication channel, the data structure from the second entity, the data structure being a TLS packet, (ii) signing, using the private key of the public private key pair, the TLS packet to obtain a signed TLS packet, (iii) providing, via the out of band communication channel, the signed TLS packet to the second entity to demonstrate that the endpoint device is trustworthy for the level of trust, and/or (iv) other methods.

Obtaining the data structure may include: (i) reading the data structure from storage, (ii) receiving the data structure as a transmission (via a network module of the endpoint device) from the second entity, and/or (iii) other methods.

Signing the TLS packet may include generating cryptographic information using a payload and the private key (e.g., a hash of the payload and the private key) and/or other methods.

Providing the signed TLS packet to the second entity may include: (i) transmitting, via the out of band communication channel, the signed TLS packet via the network module of the endpoint device, (ii) storing the signed TLS packet in a storage architecture shared with the second entity and notifying the second entity that the signed TLS packet is available in the shared storage architecture, (iii) transmitting the signed TLS packet to another trusted entity responsible for providing the signed TLS packet to the second entity, and/or (iv) other methods.

The method may end following operation 306.

Doing so may complete at least a portion of a TLS handshake between the endpoint device and the second entity. However, more than one entity may desire the level of trust with the endpoint device. For example, consider a scenario in which a third entity has access to the certificate for the endpoint device (e.g., via an interaction with the first entity). The third entity may initiate a second TLS handshake between the third entity and the endpoint device.

Doing so may include: (i) obtaining, via an in band communication channel, a second data structure from the third entity, the third entity having access to the certificate for the endpoint device and the second data structure being a second TLS packet, (ii) providing, via a side band channel, the second TLS packet to a management controller of the endpoint device, (iii) signing, using the private key of the public private key pair, the second TLS packet to obtain a second signed TLS packet, (iv) providing, via the side band communication channel, the second signed TLS packet to a software agent hosted by hardware resources of the endpoint device, (v) providing, via the in band communication channel, the second signed TLS packet to the third entity to demonstrate that the endpoint device is trustworthy for a second level of trust with the third entity.

Obtaining the second data structure may include: (i) reading the second data structure from storage, (ii) receiving the second data structure as a transmission (via a network module of the endpoint device) from the third entity, and/or (iii) other methods.

Providing the second TLS packet to the management controller of the endpoint device may include sending, via the side band communication channel, the signed TLS packet to the management controller via a software application responsible for managing communications between the management controller and other components of the endpoint device.

Signing the second TLS packet may include generating second cryptographic information using a second payload and the private key (e.g., a hash of the second payload and the private key) and/or other methods.

Providing the second TLS packet to the software agent hosted by the hardware resources of the endpoint device may include: (i) sending, via the side band communication channel, the second signed TLS packet as a message to the software agent, (ii) storing the second signed TLS packet in a storage architecture accessible by the software agent, and/or (iii) other methods.

Providing the second signed TLS packet to the third entity may include: (i) transmitting, via the in band communication channel, the second signed TLS packet via the network module of the endpoint device, (ii) storing the second signed TLS packet in a storage architecture shared with the third entity and notifying the third entity that the second signed TLS packet is available in the shared storage architecture, (iii) transmitting the second signed TLS packet to another trusted entity responsible for providing the second signed TLS packet to the third entity, and/or (iv) other methods.

Doing so may contribute to the second TLS handshake between the endpoint device and the third entity. Signing the second TLS packet using the private key kept secret by the management controller of the endpoint device may contribute to a level of security for the second TLS handshake.

To further contribute to the level of security of TLS handshakes between the endpoint device and other entities, the management controller may replace the public private key pair. The management controller may replace the public private key pair for any reason including: (i) if the private key of the public private key pair is suspected of being known by any other entity other than the management controller, (ii) if the public private key pair becomes stale (e.g., via any policy for replacing public private key pairs over time, and/or (iii) other reasons.

Replacing the public private key pair may include: (i) identifying that the public private key pair is to be replaced, (ii) generating, in response to the identifying, a second public private key pair to replace the public private key pair, and/or (iii) other methods.

Identifying that the public private key pair is to be replaced may include: (i) receiving a notification that the private key is suspected to be known by any entity other than the management controller, (ii) reading a policy for aging out of the public private key pair and determining, based on the policy, that the public private key pair is stale, and/or (iii) other methods.

Generating the second public private key pair may include: (i) executing any key pair generation algorithm to obtain the second public private key pair, (ii) storing a second private key of the second public private key pair in storage screened from hardware resources of the endpoint device, (iii) providing a second public key of the second public private key pair to any entity in order to update, for example, the certificate for the endpoint device, and/or (iv) other methods.

Figure 4:
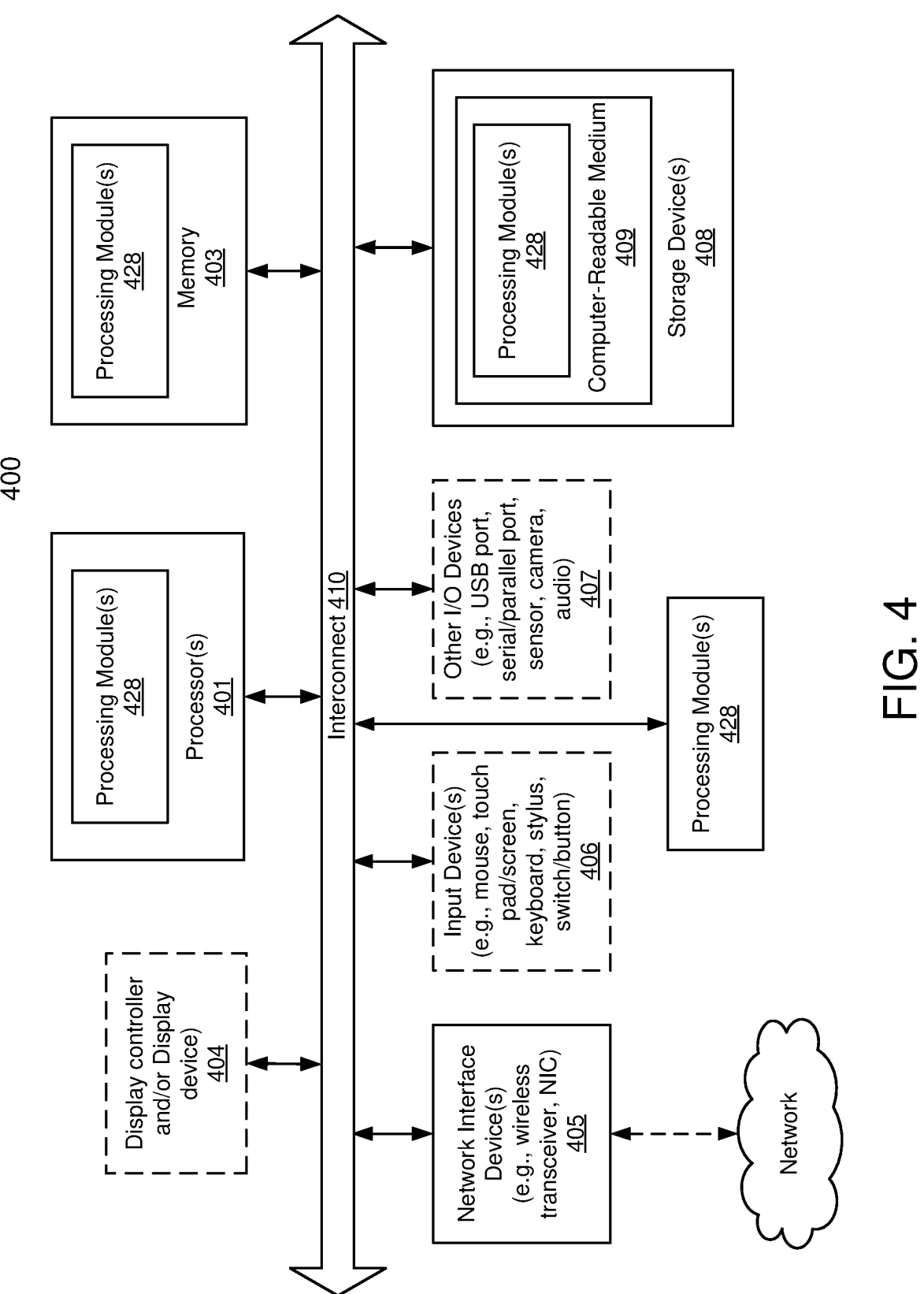
FIG. 4 shows a block diagram illustrating a data processing system in accordance with an embodiment.

Any of the components illustrated in FIGS. 1A-2C may be implemented with one or more computing devices. Turning to FIG. 4, a block diagram illustrating an example of a data processing system (e.g., a computing device) in accordance with an embodiment is shown. For example, system 400 may represent any of data processing systems described above performing any of the processes or methods described above. System 400 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 400 is intended to show a high-level view of many components of the computer system. However, it is to be understood that additional components may be present in certain implementations and furthermore, different arrangement of the components shown may occur in other implementations. System 400 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 400 includes processor 401, memory 403, and devices 405-407 via a bus or an interconnect 410. Processor 401 may represent a single processor or multiple processors with a single processor core or multiple processor cores included therein. Processor 401 may represent one or more general-purpose processors such as a microprocessor, a central processing unit (CPU), or the like. More particularly, processor 401 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 401 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 401, which may be a low power multi-core processor socket such as an ultra-low voltage processor, may act as a main processing unit and central hub for communication with the various components of the system. Such processor can be implemented as a system on chip (SoC). Processor 401 is configured to execute instructions for performing the operations discussed herein. System 400 may further include a graphics interface that communicates with optional graphics subsystem 404, which may include a display controller, a graphics processor, and/or a display device.

Processor 401 may communicate with memory 403, which in one embodiment can be implemented via multiple memory devices to provide for a given amount of system memory. Memory 403 may include one or more volatile storage (or memory) devices such as random-access memory (RAM), dynamic RAM (DRAM), synchronous DRAM (SDRAM), static RAM (SRAM), or other types of storage devices. Memory 403 may store information including sequences of instructions that are executed by processor 401, or any other device. For example, executable code and/or data of a variety of operating systems, device drivers, firmware (e.g., input output basic system or BIOS), and/or applications can be loaded in memory 403 and executed by processor 401. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 400 may further include IO devices such as devices (e.g., 405, 406, 407, 408) including network interface device(s) 405, optional input device(s) 406, and other optional IO device(s) 407. Network interface device(s) 405 may include a wireless transceiver and/or a network interface card (NIC). The wireless transceiver may be a Wi-Fi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 406 may include a mouse, a touch pad, a touch sensitive screen (which may be integrated with a display device of optional graphics subsystem 404), a pointer device such as a stylus, and/or a keyboard (e.g., physical keyboard or a virtual keyboard displayed as part of a touch sensitive screen). For example, input device(s) 406 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 407 may include an audio device. An audio device may include a speaker and/or a microphone to facilitate voice-enabled functions, such as voice recognition, voice replication, digital recording, and/or telephony functions. Other IO devices 407 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. IO device(s) 407 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 410 via a sensor hub (not shown), while other devices such as a keyboard or thermal sensor may be controlled by an embedded controller (not shown), dependent upon the specific configuration or design of system 400.

To provide for persistent storage of information such as data, applications, one or more operating systems and so forth, a mass storage (not shown) may also couple to processor 401. In various embodiments, to enable a thinner and lighter system design as well as to improve system responsiveness, this mass storage may be implemented via a solid state device (SSD). However, in other embodiments, the mass storage may primarily be implemented using a hard disk drive (HDD) with a smaller amount of SSD storage to act as an SSD cache to enable non-volatile storage of context state and other such information during power down events so that a fast power up can occur on re-initiation of system activities. Also, a flash device may be coupled to processor 401, e.g., via a serial peripheral interface (SPI). This flash device may provide for non-volatile storage of system software, including a basic input/output software (BIOS) as well as other firmware of the system.

Storage device 408 may include computer-readable storage medium 409 (also known as a machine-readable storage medium or a computer-readable medium) on which is stored one or more sets of instructions or software (e.g., processing module, unit, and/or processing module/unit/logic 428) embodying any one or more of the methodologies or functions described herein. Processing module/unit/logic 428 may represent any of the components described above. Processing module/unit/logic 428 may also reside, completely or at least partially, within memory 403 and/or within processor 401 during execution thereof by system 400, memory 403 and processor 401 also constituting machine-accessible storage media. Processing module/unit/logic 428 may further be transmitted or received over a network via network interface device(s) 405.

Computer-readable storage medium 409 may also be used to store some software functionalities described above persistently. While computer-readable storage medium 409 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of embodiments disclosed herein. The term "computer-readable storage medium" shall accordingly be taken to include, but not be limited to, solid-state memories, and optical and magnetic media, or any other non-transitory machine-readable medium.

Processing module/unit/logic 428, components and other features described herein can be implemented as discrete hardware components or integrated in the functionality of hardware components such as ASICS, FPGAs, DSPs, or similar devices. In addition, processing module/unit/logic 428 can be implemented as firmware or functional circuitry within hardware devices. Further, processing module/unit/logic 428 can be implemented in any combination hardware devices and software components.

Note that while system 400 is illustrated with various components of a data processing system, it is not intended to represent any particular architecture or manner of interconnecting the components; as such details are not germane to embodiments disclosed herein. It will also be appreciated that network computers, handheld computers, mobile phones, servers, and/or other data processing systems which have fewer components or perhaps more components may also be used with embodiments disclosed herein.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments disclosed herein also relate to an apparatus for performing the operations herein. Such a computer program is stored in a non-transitory computer readable medium. A non-transitory machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments disclosed herein are not described with reference to any particular programming language. It will be appreciated that a variety of programming languages may be used to implement the teachings of embodiments disclosed herein.

In the foregoing specification, embodiments have been described with reference to specific exemplary embodiments thereof. It will be evident that various modifications may be made thereto without departing from the broader spirit and scope of the embodiments disclosed herein as set forth in the following claims. The specification and drawings are, accordingly, to be regarded in an illustrative sense rather than a restrictive sense.

What is claimed is:

1. A method of managing an endpoint device comprising hardware resources and a management controller that operates independently of the hardware resources, the method comprising:

receiving, from a first entity, a request to initiate a process in which the first entity generates a certificate;

generating, by a management controller of the endpoint device, a public private key pair;

storing, on the endpoint device, a private key of the public private key pair in storage screened from the hardware resources;

providing, by the management controller, a public key of the public private key pair to the first entity, the public key being usable to generate the certificate for the endpoint device;

obtaining, by the management controller and responsive to the providing, the certificate from the first entity, the certificate having been generated using the public key; and signing, by the management controller and using a private key of the public private key pair, a data structure usable to establish a level of trust with a second entity that has access to the certificate.

2. The method of claim 1, wherein signing the data structure comprises:

obtaining, by the management controller and via an out of band communication channel, the data structure from the second entity, the data structure being a transport layer security (TLS) packet;

signing, by the management controller and using the private key of the public private key pair, the TLS packet to obtain a signed TLS packet; and providing, by the management controller and via the out of band communication channel, the signed TLS packet to the second entity to demonstrate that the endpoint device is trustworthy for the level of trust.

3. The method of claim 2, further comprising:

obtaining, by a software agent hosted by hardware resources of the endpoint device and via an in band communication channel, a second data structure from a third entity, the third entity having access to the certificate for the endpoint device and the second data structure being a second TLS packet;

providing, by the software agent and via a side band communication channel, the second TLS packet to the management controller;

signing, by the management controller and using the private key of the public private key pair, a second TLS packet to obtain a second signed TLS packet;

providing, by the management controller and via the side band communication channel, the second signed TLS packet to the software agent; and providing, by the software agent and via the in band communication channel, the second signed TLS packet to the third entity to demonstrate that the endpoint device is trustworthy for a second level of trust with the third entity.

4. The method of claim 1, wherein the private key of the public private key pair is kept secret by the management controller.

5. The method of claim 1, further comprising:

making an identification, by the management controller, that the public private key pair is to be replaced; and generating, by the management controller and in response to the identification, a second public private key pair to replace the public private key pair.

6. The method of claim 5, wherein the public private key pair is to be replaced when the private key of the public private key pair is suspected of being known by any other entity other than the management controller.

7. The method of claim 5, wherein the public private key pair is to be replaced when the public private key pair becomes stale.

8. The method of claim 1, wherein the endpoint device comprises a network module adapted to separately advertise network endpoints for the management controller and the hardware resources, the network endpoints being usable by the first entity, the second entity, and/or any other entity to address communications to the hardware resources using an in band communication channel and the management controller using the out of band communication channel.

9. The method of claim 8, wherein the management controller and the network module are on separate power domains from the hardware resources so that the management controller and the network module are operable while the hardware resources are inoperable.

10. The method of claim 8, wherein the out of band communication channel runs through the network module, and an in band communication channel that services the hardware resources also runs through the network module.

11. The method of claim 8, wherein the network module hosts a transmission control protocol/internet protocol (TCP/IP) stack to facilitate network communications via the out of band communication channel.

12. A non-transitory machine-readable medium having instructions stored therein, which when executed by a processor, cause the processor to perform operations for managing an endpoint device comprising hardware resources and a management controller that operates independently of the hardware resources, the operations comprising:

receiving, from a first entity, a request to initiate a process in which the first entity generates a certificate;

generating, by a management controller of the endpoint device, a public private key pair;

storing, on the endpoint device, a private key of the public private key pair in storage screened from the hardware resources;

providing, by the management controller, a public key of the public private key pair to the first entity, the public key being usable to generate a certificate for the endpoint device;

obtaining, by the management controller and responsive to the providing, the certificate from the first entity, the certificate having been generated using the public key; and signing, by the management controller and using a private key of the public private key pair, a data structure usable to establish a level of trust with a second entity that has access to the certificate.

13. The non-transitory machine-readable medium of claim 12, wherein signing the data structure comprises:

obtaining, by the management controller and via an out of band communication channel, the data structure from the second entity, the data structure being a transport layer security (TLS) packet;

signing, by the management controller and using the private key of the public private key pair, the TLS packet to obtain a signed TLS packet; and providing, by the management controller and via the out of band communication channel, the signed TLS packet to the second entity to demonstrate that the endpoint device is trustworthy for the level of trust.

14. The non-transitory machine-readable medium of claim 13, further comprising:

obtaining, by a software agent hosted by hardware resources of the endpoint device and via an in band communication channel, a second data structure from a third entity, the third entity having access to the certificate for the endpoint device and the second data structure being a second TLS packet;

providing, by the software agent and via a side band communication channel, the second TLS packet to the management controller;

signing, by the management controller and using the private key of the public private key pair, a second TLS packet to obtain a second signed TLS packet;

providing, by the management controller and via the side band communication channel, the second signed TLS packet to the software agent; and providing, by the software agent and via the in band communication channel, the second signed TLS packet to the third entity to demonstrate that the endpoint device is trustworthy for a second level of trust with the third entity.

15. The non-transitory machine-readable medium of claim 12, wherein the private key of the public private key pair is kept secret by the management controller.

16. The non-transitory machine-readable medium of claim 12, further comprising:

making an identification, by the management controller, that the public private key pair is to be replaced; and generating, by the management controller and in response to the identification, a second public private key pair to replace the public private key pair.

17. A data processing system, comprising:

a processor; and a memory coupled to the processor to store instructions, which when executed by the processor, cause the processor to perform operations for managing an endpoint device comprising hardware resources and a management controller that operates independently of the hardware resources, the operations comprising:

receiving, from a first entity, a request to initiate a process in which the first entity generates a certificate;

generating, by a management controller of the endpoint device, a public private key pair;

storing, on the endpoint device, a private key of the public private key pair in storage screened from the hardware resources;

providing, by the management controller, a public key of the public private key pair to the first entity, the public key being usable to generate the certificate for the endpoint device;

obtaining, by the management controller and responsive to the providing, the certificate from the first entity, the certificate having been generated using the public key; and signing, by the management controller and using a private key of the public private key pair, a data structure usable to establish a level of trust with a second entity that has access to the certificate.

18. The data processing system of claim 17, wherein signing the data structure comprises:

obtaining, by the management controller and via an out of band communication channel, the data structure from the second entity, the data structure being a transport layer security (TLS) packet;

signing, by the management controller and using the private key of the public private key pair, the TLS packet to obtain a signed TLS packet; and providing, by the management controller and via the out of band communication channel, the signed TLS packet to the second entity to demonstrate that the endpoint device is trustworthy for the level of trust.

19. The data processing system of claim 17, wherein the operations further comprise:

obtaining, by a software agent hosted by hardware resources of the endpoint device and via an in band communication channel, a second data structure from a third entity, the third entity having access to the certificate for the endpoint device and the second data structure being a second TLS packet;

providing, by the software agent and via a side band communication channel, the second TLS packet to the management controller;

signing, by the management controller and using the private key of the public private key pair, a second TLS packet to obtain a second signed TLS packet;

providing, by the management controller and via the side band communication channel, the second signed TLS packet to the software agent; and providing, by the software agent and via the in band communication channel, the second signed TLS packet to the third entity to demonstrate that the endpoint device is trustworthy for a second level of trust with the third entity.

20. The data processing system of claim 17, wherein the private key of the public private key pair is kept secret by the management controller.

* * * * *